June 3, 1941.　　　　E. M. LAWTON　　　　2,244,559
DUMP TRUCK HOIST
Filed Oct. 8, 1940　　　　2 Sheets-Sheet 2
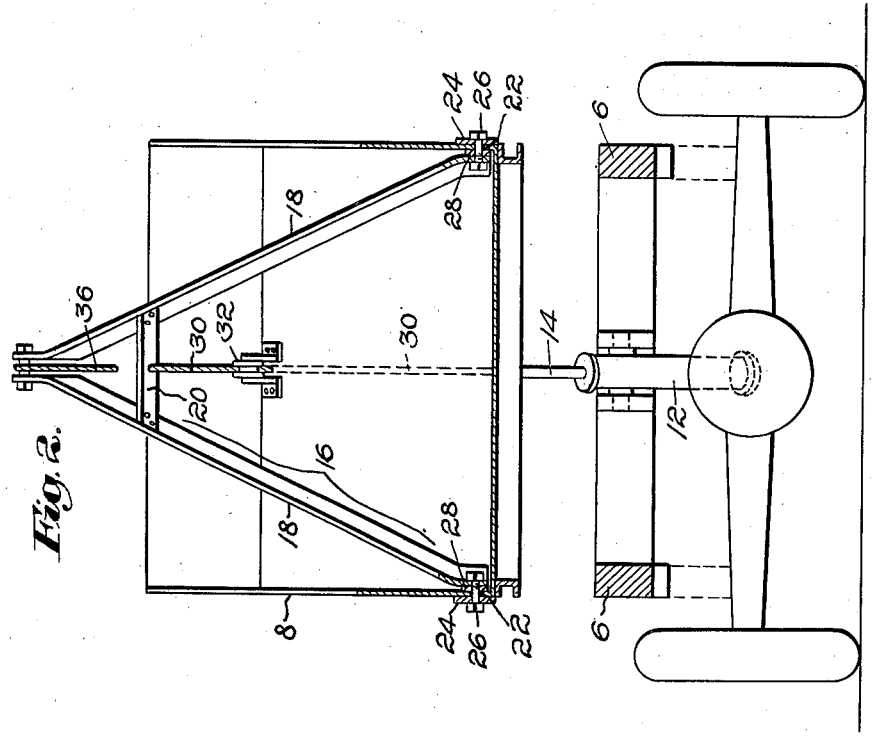
Inventor:
Edward M. Lawton Patented June 3, 1941

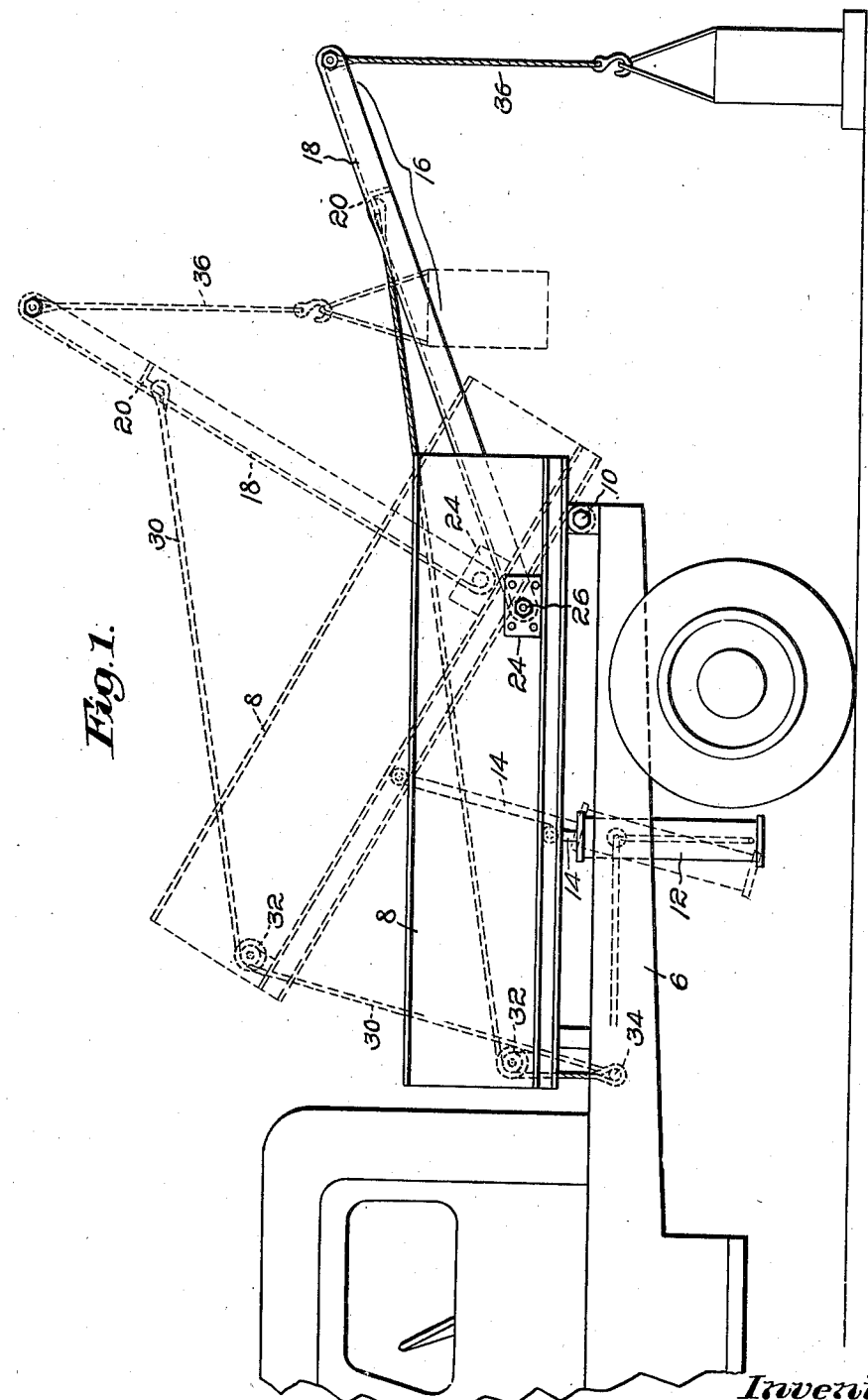

2,244,559

UNITED STATES PATENT OFFICE 2,244,559

DUMP TRUCK HOIST

Edward M. Lawton, Chelsea, Mass.

Application October 8, 1940, Serial No. 360,208

5 Claims. (Cl. 212—8)

The present invention provides a construction whereby a dump truck, that is, a truck having a tilting body, may be utilized as a hoist for handling heavy weights. For this purpose I provide for mounting on any usual or suitable truck of such type simple inexpensive parts which provide a jib or boom operated by the tipping movement of the body under its actuating means. The arrangement need call for no extensive alterations of the truck itself and need in no way interfere with its utilization as a truck. To this end the parts are desirably such as to be easily removed and replaced and preferably when removed are capable of being stored in or carried by the truck without substantial interference with its primary functions.

My invention will be well understood by reference to the following description of the illustrative embodiment thereof shown by way of example in the accompanying drawings, wherein:

Fig. 1 is a side elevation of the rear portion of an automobile truck equipped to embody the invention; and Fig. 2 is a transverse section looking forwardly with the body in the elevated or tipped position.

Referring to the drawings, I have there shown an automobile truck having an under-frame 6 on which is mounted a body 8 of the box type pivoted on a transverse axis 10 at the rear of the under-frame. Any suitable means may be provided for tilting the body to the dotted line position of Fig. 1 and I have herein illustrated in a very general way a hydraulic cylinder 12 trunnioned on the under-frame and having a connecting rod 14 jointed at its ends to the piston and to the under part of the body 8 respectively. For a more complete disclosure of such a mechanism reference may be made to British Patent 252,947. In the present case this illustration is merely a graphic indication of elevating or tilting means which may be any suitable power mechanism or power-multiplying mechanism usual or adaptable for the purpose.

On the vehicle is stepped a lifting boom 16. I prefer to mount it on, or rather in, the body 8, as in the example illustrated, for reasons which will hereinafter appear. As best seen in Fig. 2, the boom herein shown is in the nature of sheers, being in the form of an A frame, comprising a pair of downwardly diverging legs 18 and a cross-brace 20, the lower ends of the legs lying adjacent the inner sides of the box body 8. Holes 22 may be cut through the sides of the body and on the outer sides thereof reinforcing plates 24 are secured, which plates have openings aligned with holes 22 providing relatively extended bearing surfaces. Removable journal pins 26, which may take the form of ordinary bolts, may pass through the ends of the legs and the bearings in the plates and provide a mounting for the boom permitting it to swing in a vertical plane. Washers 28 are shown in Fig. 2 between the ends of the legs 18 and the inner faces of the sides of the body. The boom 16 is easily stepped and unstepped with the use of no more complicated tools than an ordinary wrench from the tool box of the truck and, in the example illustrated, because of the location of the bearings in plates 24 outboard of the sides of the body the interior of the box body 8 is unencumbered when the boom is unstepped.

To luff the boom, that is, to swing it in its vertical plane, a line 30 extends from a point near the head of the boom and herein is trained over a sheave 32 at the front end of the body near the floor thereof and made fast to the under-frame at 34 at a point below the front end of the body. The length of the line determines the initial angle of the boom, as shown in full lines.

When the body-tilting mechanism is operated, the front end of the body swings upwardly to the dotted line position of Fig. 1, the sheave running along the bight of the line and displacing it toward the left in the figure so as to draw on that portion of the line which runs from the sheave to the head of the boom and raise the latter to the dotted line position shown. Any suitable pendant or tackle 36 from the end of the boom supports the load. I have herein illustrated it as provided with a hook engaging a sling which secures the article to be lifted.

It is for several reasons advantageous to have the moving part of the body act on the bight of the luffing line as herein shown. When the lifting operation is started, the pressure of the sheave acts to exert a greatly increased tension on the head of the boom because of the wide span of the two parts of the line extending respectively to the boom head and to the anchorage 34. Also a relatively long hoist may be made relative to the movement of the sheave because there is a double fall or lead to that sheave. Moreover, as will be apparent from the figure, the point of contact of the sheave with the line, that is, the point where power is applied, rises as the head of the boom rises, thus preserving a favorable angle for the lifting traction on the head of the boom. Therefore, with the parts arranged as shown in the figure, no upright or mast is necessary to give the proper lead to the line between the head of the boom and the point of application of traction.

I have already referred to the fact that in the preferred construction the boom is stepped on the body of the truck and, as seen in Fig. 1, while the step is adjacent the pivotal axis 10, it is displaced therefrom, therein toward the front of the truck. A differential action is thereby effected. It is apparent from Fig. 1 that as the body tips the step of the boom is raised or, otherwise expressed, the boom is lifted bodily. At the same time the boom is luffed or swung in a vertical plane by the action of the body on the line 30.

The boom and its appurtenant cordage, dismounted, may be carried on the truck without inconvenience. Then in a few moments the truck may be converted into a travelling crane for general lifting purposes, such, for example, as loading other trucks.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A vehicle of the dumping type having a tipping body and means for elevating the forward end of the same, a boom stepped on the vehicle body at one side of the pivotal axis thereof for swinging movement in a vertical plane, a luffing line extending from the head portion of the boom and made fast to a fixed part of the vehicle, and means carried by a portion of the body which rises in tipping movement making contact with the bight of the line whereby on tilting of the body the boom is swung and the elevation of its foot simultaneously altered.

2. A vehicle of the dumping type having a tipping body and means for elevating the forward end of the same, a boom stepped on the vehicle body forwardly of the pivotal axis thereof for swinging movement in a vertical plane, a luffing line extending from the head portion of the boom and made fast to a fixed part of the vehicle, and means carried by a portion of the body which rises in tipping movement making contact with the bight of the line whereby on tipping of the body the foot of the boom is elevated and its head simultaneously swung upwardly.

3. A vehicle having a dumping body of the box type and means for elevating the forward end to dump the load at the rear, a boom adapted to project at the rear of the vehicle having legs, the lower ends of which are disposed within the sides of the body and journalled thereto, a luffing line from the upper part of the boom and means including tension-supporting bearings for the line on a fixed part of the vehicle and on the forward end of the body to draw on the line to raise the head of the boom as said end rises to dumping position.

4. A vehicle having a dumping body of the box type and means for elevating the forward end to dump the load at the rear, the sides of the box having openings adjacent the tipping axis thereof, bearings mounted on the exterior of the sides at said openings, a boom adapted to project at the rear of the vehicle having legs, the lower ends of which are disposed within the sides of the box, means for demountably stepping said ends in said bearings, a luffing line from the upper part of the boom and means including tension-supporting bearings for the line on a fixed part of the vehicle and on the forward end of the body to draw on the line to raise the head of the boom as said end rises to dumping position.

5. In combination with a vehicle of the dumping type having a box body pivoted on a horizontal axis and means for elevating the forward end of the body, a demountable boom pivotally mounted within the sides of the body to project at the rear of the vehicle, a luffing line from the upper part of the boom, and a guide sheave at the forward end of the body which rises on dumping movement, over which sheave the line runs, the end of the line being anchored to a fixed part of the vehicle below the sheave.

EDWARD M. LAWTON.